United States Patent [19]
Maker

[11] 3,838,264
[45] Sept. 24, 1974

[54] APPARATUS FOR, AND METHOD OF, CHECKING THE CONTENTS OF A COMPUTER STORE

[76] Inventor: Paul Manwaring Maker, 429 Brook Ln., Birmingham, England

[22] Filed: Feb. 20, 1973

[21] Appl. No.: 333,503

Related U.S. Application Data

[63] Continuation-in-part of Ser. No. 201,554, Nov. 23, 1971, abandoned.

[30] Foreign Application Priority Data

Nov. 25, 1970 Great Britain .................... 56017/70

[52] U.S. Cl. .......................................... 235/153 AM
[51] Int. Cl. .......................................... G11c 29/00
[58] Field of Search ............. 235/153 AM, 153 AC, 235/153 AP

[56] References Cited

UNITED STATES PATENTS

| | | | |
|---|---|---|---|
| 3,336,579 | 8/1967 | Heymann | 235/153 AC |
| 3,579,199 | 5/1971 | Anderson et al. | 235/153 AM |
| 3,582,633 | 6/1971 | Webb | 235/153 AC |
| 3,633,174 | 1/1972 | Griffin | 235/153 AC |
| 3,751,649 | 8/1973 | Hart, Jr. | 235/153 AC |

*Primary Examiner*—Charles E. Atkinson
*Attorney, Agent, or Firm*—Holman & Stern

[57] ABSTRACT

An apparatus for checking the contents of a store of a computer which is normally under control of a train of timing pulses, and in which the store is normally controlled by an address register in the computer, comprises a switching arrangement responsive to a command signal to remove the pulses from the remainder of the computer then automatically being returned to control of the pulses and the sum being retained for comparison with a known quantity.

10 Claims, 1 Drawing Figure

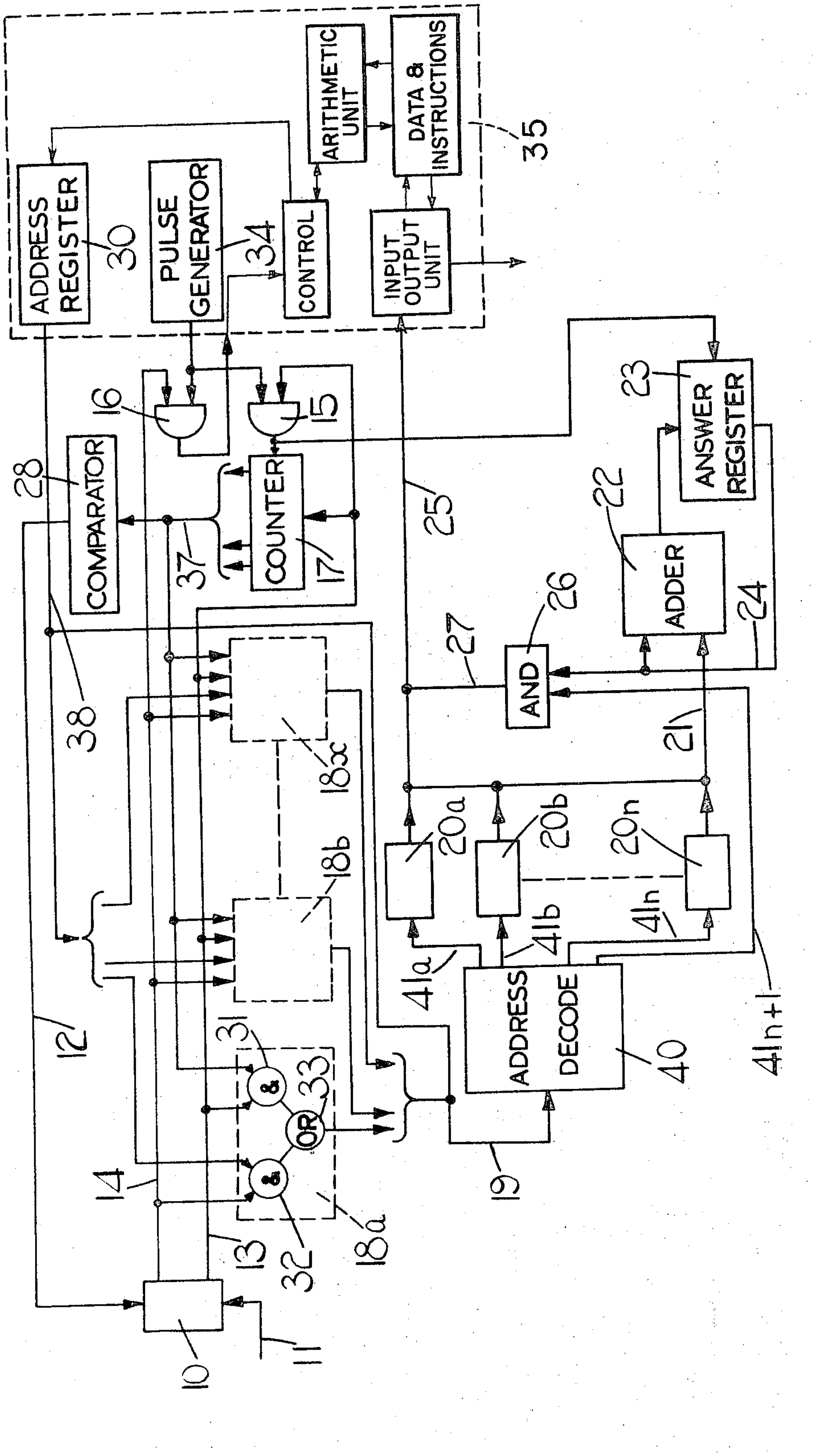
ADDRESS REGISTER
PULSE GENERATOR
CONTROL
ARITHMETIC UNIT
DATA & INSTRUCTIONS
INPUT OUTPUT UNIT
COMPARATOR
COUNTER
ANSWER REGISTER
ADDER
AND
ADDRESS DECODE
&
OR
10
11
12
13
14
15
16
17
18a
18b
18x
19
20a
20b
20n
21
22
23
24
25
26
27
28
30
31
32
33
34
35
37
38
40
41a
41b
41n
41n+1

APPARATUS FOR, AND METHOD OF, CHECKING THE CONTENTS OF A COMPUTER STORE

This invention relates to apparatus for checking the contents of a computer store and is a continuation-in-part of application Ser. No. 201,554, filed Nov. 23, 1971, now abandoned.

According to the invention an apparatus for checking the contents of a store of a computer having an associated source of timing pulses comprises a bistable device responsive to a first input signal to provide a first output control signal and to a second input signal to provide a second output control signal, a counter, a first switching means responsive to the first output control signal to supply the timing pulses to an input of the counter, a second switching means responsive to the second output control signal to supply the timing pulses to the computer, a logic circuit which operates in the presence of the first output control signal to place the store under the control of an output from the counter and in the presence of the second output control signal to place the store under the control of the computer means operable when the count state of the counter has reached a predetermined value, for providing the second input signal, adding means controlled by the said timing pulses for providing a sum of the contents of locations within the said store when the latter is controlled by the counter output and means for supplying the said sum to the computer for comparison with a required value.

The invention also resides in a method of checking the contents of a store of a computer which is, in use, under the control of an associated source of timing pulses, including the steps of summing the contents of locations in the store and comparing the sum with a predetermined value, the store being controlled for the duration of the summing operation by the said timing pulses and being otherwise isolated from the remainder of the computer, and the said remainder of the computer being isolated for the said duration from the source of timing pulses.

Accordingly, one object of the present invention is to provide a method and apparatus for determining that preassigned data within the store of a computer are properly stored therein.

An example of an apparatus according to the invention will now be described with reference to the accompanying drawing which shows a block diagram of such an apparatus.

In the following description the presence or absence of a signal should be construed as being logically equivalent to '1' and '0' respectively, that is, the presence or absence respectively of that signal which can actuate or change the state of a device to which it is supplied. A signal of any magnitude which is logically equivalent to '0' is thus referred to as if no signal were present.

A bistable device 10 has a first input line 11 to which may be applied a pulse to initiate operation of the apparatus, and a second input line 12 for a second input signal obtained in a manner later to be described. Device 10 has a pair of output lines 13, 14 on which first and second control signals, respectively are set by signals on input lines 11, 12.

A pair of AND gates 15, 16 each has as an input a train of timing pulses supplied by a pulse generator 34 forming part of an associated computer 35. As seen in the drawing, computer 35 includes, in addition to address register 30 and pulse generator 34, a control unit, an arithmetic unit, an input/output unit, and a store for data and programme instructions. The operation and functional interrelationships between the individual units which comprise computer 35 are well known to a person of ordinary skill in the art as taught, for example, in "An Introduction to Digital Computing" by B. W. Arden at p. 60 et seq., Addison-Wesley, 1963. Gate 15 operates in the presence of a signal at output line 13 of bistable 10 to supply the timing pulses to a binary counter 17. Counter 17 provides a signal on a selected one of a group of output lines 37, dependent on the count state of counter 17. A logic circuit 18 comprises a number of logic units 18*a* to 18*x*. Logic unit 18*a* comprises pairs of AND gates 31, 32 the outputs of each pair forming the inputs of an associated OR gate 33. The further logic circuits, 18*b* to 18*x* are identical with logic circuit 18*a*.

The respective output lines 37 from counter 17 provide one input to the AND gates 31 which form part of the respective units 18*a* to 18*x*. The other inputs of the gates 31 are provided by the output line 13 of device 10. Output pulses from the counter 17 are supplied to a comparator circuit 28 which provides a signal to input line 12 of bistable device 10 when the count state of counter 17 reaches a value $x$.

An address register 30, forming part of computer 35, has $x + 1$ output lines 38. A number $x$ of the lines 38 are respectively connected to one input of the AND gates 32 of units 18*a* to 18*x*. The other inputs of AND gates 32 are connected to the output line 14 of device 10. The ones of gates 32 which are supplied with signals on lines 38 depends on the data currently within the address register 30.

A plurality of store locations, 20*a* to 20*n*, each comprises a "read only" memory unit which can initially be loaded with digital data, this data being subsequently unchanged. The number $x$ is equal to the number of binary digits required to define all of the address locations of store 20.

The outputs of OR gates 33 of units 18*a* to 18*x* are connected to respective inputs of a decode circuit 40 via lines 19. Selected ones of lines 38 from address register 30 are also connected via selected ones of lines 19 to inputs of decode circuit 40. Decode circuit 40 is of a known type such that, in response a given combination of signals on lines 19, there is a signal on a single one of a plurality of output lines 41*a* to 41*n* + 1. Lines 41*a* to 41*n* are respectively connected to store locations 20*a* to 20*n*, the arrangement being such that output signals from a given combination of units 18 causes data to be read out from one of the store locations 20*a* to 20*n*.

Store locations 20*a* to 20*n* have a group of output lines 25 which are connected to the computer 35, whereby data from these locations may be processed by the computer in accordance with programmed instructions. Store locations 20*a* to 20*n* also have a group of output lines 21 which are connected to an adder circuit 22. Associated with adder 22 is an answer register 23, controlled by the output from AND gate 15. A group of output lines 24 from answer register 23 provides a further input for the adder 22, whereby as the contents of store locations 20*a* to 20*n* are successively supplied to adder 22, a running total is obtained in the register 23. Output lines 24 also connected to a second input of AND gate circuit 26, whereby when there is a signal on line $41n + 1$, data from answer register 23 is passed by circuit 26, lines 27, and lines 25 to the computer 35.

In use, the computer will normally be operating under control of the timing pulses from the generator 34. If a pulse is applied to input line 11 the bistable device 10 changes state to provide a control signal at output line 13, causing the timing pulses to pass via AND gate 15 to counter 17. The resulting signals on lines 37 are supplied to the respective units 18*a* to 18*x* to address store locations 20*a* to 20*n* sequentially.

Absence of a control signal at output line 14 causes gate 16 to isolate the generator 34 from the remainder of computer 35 and also, via unit 18*a* to 18*x*, removes store 20 from control of the address register 30.

Under control of the timing pulses applied to the store 20 and to the answer register 23, the adder 22 operates in a known manner to obtain a running total of the contents of the store locations. The comparator 28 is set to a level corresponding to the number $x$ required to define the number of locations in the store 20, and when the counter 17 reaches this level a signal is applied to input line 12 of bistable device 10 which then reverts to its initial state. The resultant signal on output line 14 causes AND gate 16 to pass timing pulses to the computer 35 and places store 20 under control of address register 30. The absence of a signal on line 13 resets counter 17 to its initial state and inhibits supply of timing pulses to counter 17 and register 23.

The total is retained in the answer register 23 until withdrawn therefrom under control of the computer programme for comparison with required value. The required value with which the total in register 23 is compared forms part of the data in storage within computer 35. This last operation is effected by the address register 30 which causes decode circuit 40 to provide the necessary control signal to AND circuit 26.

I claim:

1. An apparatus for checking the contents of a digital data store, comprising a computer, means for supplying timing pulses to said computer, a bistable device responsive to a first input signal to provide a first output control signal and to a second input signal to provide a second output control signal, a counter, a first switching means responsive to the first output control signal to supply the timing pulses to an input of the counter, a second switching means responsive to the second output control signal to supply the timing pulses to the computer, a logic circuit which operates in the presence of the first output control signal to place the store under the control of an output from the counter and in the presence of the second output control signal to place the store under the control of the computer, means operable when the count state of the counter has reached a predetermined value, for providing the second input signal, adding means controlled by the said timing pulses for providing a sum of the contents of locations within the said store when the latter is controlled by the counter output and means for supplying the said sum to the computer for comparison with a required value.

2. An apparatus as claimed in claim 1 which includes means, operable in the absence of said first output control signal, to reset the counter to an initial condition.

3. An apparatus as claimed in claim 1 in which the first switching means comprises an AND gate adapted to receive as its inputs the said timing pulses and said first output control signal.

4. An apparatus as claimed in claim 1 in which the second switching means comprises an AND gate adapted to receive as its inputs the said timing pulses and said second output control signal.

5. An apparatus as claimed in claim 1 in which the said logic circuit comprises pairs of AND gates and an OR gate associated with each pair of AND gates, the inputs of said OR gates being provided by the outputs of the associated AND gates.

6. An apparatus as claimed in claim 5 in which one AND gate of each said pair is adapted to receive as inputs the first output control signal and said counter output and the other AND gate of each pair is adapted to receive as inputs the second output control signal and a signal from an address register which forms part of the computer.

7. An apparatus as claimed in claim 1 in which the means for providing the second input signal comprises a comparator circuit having as an input the said counter output.

8. An apparatus as claimed in claim 1 in which said means for providing a sum comprises an adder to which signals from locations in the said store are sequentially supplied when the latter is controlled by the counter output.

9. An apparatus as claimed in claim 8 in which said summing means further comprises an answer circuit operable in the presence of timing pulses supplied from said first switching means to supply output signals from said adder to an input thereof, whereby an output from said answer circuit corresponds, in use, to the sum of the contents of those of the store locations which have been supplied to the adder.

10. An apparatus as claimed in claim 9 in which the means for supplying the sum to the computer comprises a gate having as one of tis inputs the output from the answer circuit and as another of its inputs an output from the logic circuit.

* * * * *